United States Patent [19]

Beckey et al.

[11] Patent Number: 4,702,305
[45] Date of Patent: Oct. 27, 1987

[54] TEMPERATURE CONTROL SYSTEM FOR CONTROL OF A MULTIPLANT ENVIRONMENTAL UNIT

[75] Inventors: Thomas J. Beckey, Edina; Kerry M. Kallas, Minneapolis, both of Minn.

[73] Assignee: Honeywell Inc., Minneapolis, Minn.

[21] Appl. No.: 31,952

[22] Filed: Mar. 30, 1987

[51] Int. Cl.[4] ............................................. F25B 29/00
[52] U.S. Cl. ......................................... 165/12; 165/29
[58] Field of Search ............. 236/46 R, 78 D; 165/12, 165/29; 62/231; 364/557, 505; 307/39

[56] References Cited

U.S. PATENT DOCUMENTS

4,387,763  6/1983  Benton ................................... 165/29
4,442,972  4/1984  Sahay et al. ...................... 236/1 EA
4,655,279  4/1987  Harmon, Jr. ...................... 165/12 X
4,674,027  6/1987  Beckey ............................... 165/12 X Primary Examiner—William E. Wayner
Attorney, Agent, or Firm—Alfred N. Feldman

[57] ABSTRACT

A temperature control system for a multiplant environmental unit utilizing a heat pump and auxiliary heat is specifically disclosed. This system is operated by a microcomputer based real time operated thermostat which provides night setback and day setup in an energy efficient manner. The efficient operation is accomplished by having separate heat pump and auxiliary heat ramp rates that can be operated together in parallel in a first mode of operation, and operated separately in a second mode of operation.

14 Claims, 7 Drawing Figures

TEMPERATURE CONTROL SYSTEM FOR CONTROL OF A MULTIPLANT ENVIRONMENTAL UNIT

BACKGROUND OF THE INVENTION

The optimum control of heating and cooling of enclosed spaces, such as residential structures, has become a highly developed art. This art has been refined by the control of the temperature in such structures by the means of real time operated thermostats that utilize microcomputers or microprocessors that have extensive memories. With the use of microcomputers and memories, it is possible to build a thermostat that is capable of accurate control and one that is capable of generating substantial energy savings. The energy savings are accomplished in the heating mode by the thermostat setting back the building temperature at night or when the building is not occupied, and then returning the temperature control to a normal temperature at a preselected time. Energy can also be saved in a cooling mode by setting the building temperature up during an unoccupied time, and then returning the temperature setting to a lower temperature for normal occupation of the building.

These changes save energy by lowering the need for energy consumption when a building is not occupied, or when the occupants can tolerate the variation from a normal temperature. These functions have been long recognized and utilized with various types of clock-operated thermostats. Technology has progressed to the point where prior temperature cycles for the building are stored in the microcomputer's memory for use in controlling the future temperature cycles within the building. This type of control, while being generally energy efficient, has a serious flaw when the heating and/or cooling source is a heat pump that utilizes auxiliary heat. Typically, a heat pump will have a very good cost efficiency, and the auxiliary electric heat will have a relatively poor cost efficiency. In present day equipment that uses setback for energy savings with heat pumps, the heat pump and electric auxiliary heat both come on during the pick up cycle. This may be inefficient from an energy standpoint as the heat pump alone might be capable of bringing the building back to a normal temperature in a reasonable period of time without the use of auxiliary heat. This function has been recognized, and outdoor sensors are sometimes incorporated in these systems. When an outdoor sensor is used, the outdoor temperature at which auxiliary heat is enabled is arbitrarily selected which may result in less than efficient use of the auxiliary electric heat. In order to obtain maximum house shell savings and system efficiency, a heat pump with auxiliary heat must be operated with a judicious use of the auxiliary heat.

SUMMARY OF THE INVENTION

The present invention is directed to a temperature control system for a multiplant environmental unit wherein a microcomputer or microprocessor based thermostat is utilized. The invention has particular utility with heat pumps that are operated in conjunction with auxiliary electric heat The electric heat typically provides a very high cost penalty in its use over the heat pump itself. The present system or invention is utilized in a setback type of thermostat wherein a lowered temperature during a night or unoccupied period is utilized for energy savings, and then the temperature is setup to a normal comfort temperature. The setup function is controlled by the present invention in a manner that provides a high degree of efficiency in the use of the heat pump and auxiliary heat, as well as providing a good response of the control temperature between the setback temperature level and the desired comfort temperature level.

In the present invention, the temperature controlled system has two separate modes of operation. The first mode of operation utilizes a temperature ramp rate to control the heat pump and provides for a second ramp rate for control of the auxiliary electric heat. These two ramp rates are maintained parallel to one another but separated by a fixed number of degrees. During the first mode of operation, the heat pump is utilized in its maximum operating capacity and the auxiliary electric heat is occasionally cycled in order to meet the heating demand required to raise the temperature from the setback temperature to the desired comfort temperature. A second mode of operation, one which comes into operation when extremely cold conditions exist, utilizes a pair of ramp rates, but the two ramp rates are not maintained in a parallel relationship. In this second mode of operation, the heat pump ramp rate is set to some minimum slope thereby indicating a cold exterior, and the auxiliary heat ramp rate is adjusted to control the auxiliary heat into operation in a substantially larger percent of time than is present during the first mode of operation.

In both the first and second modes of operation, the slope of the ramp rates is adjusted after each cycle based on the previous cycles events. The memory in the microcomputer is programmed to take the previous cycle into consideration in determining the position or slope of the ramp rates in an upcoming temperature cycle.

In accordance with the present invention, there is provided a temperature control system for control of a multiplant environmental unit for tempering the atmosphere in an enclosed space in an energy efficient manner, including: a multiplant environmental unit having at least a first output and a second output; said first output being more cost effective to operate than said second output; real time clock operated thermostat means located in said space; said thermostat means including means to enter selected temperatures and further including means to sense an ambient temperature in said space; said thermostat means having a selected comfort setpoint temperature, and further having a selected energy savings setback setpoint temperature to define limits of the operation of said multiplant environmental unit over a temperature control cycle; said thermostat means including microcomputer means having memory means and having two modes of operation; said memory means storing at least two operating time versus temperature curves with said curves selected to utilize said environment unit at said first output, or at both said first and second outputs simultaneously which causes said atmosphere to change from said energy savings setback setpoint temperature to said comfort setpoint temperature with said memory including a previous temperature control cycle; said thermostat means operating said multiplant environmental unit upon said sensor temperature intersecting a first of said operating curves which energizes said first output; said sensor temperature upon intersecting a second of said operating curves operating said second output; said curves being generally parallel to one another in a first of said modes of operation; and said first of said operating curves being held fixed at a minimum slope in a second of said modes with said second of said curves being adjusted in slope to increase or decrease the operation of said second output based upon said previous temperature cycle.

Futher in accordance with the present invention a real time clock operated thermostat means for control in an energy efficient manner of a heat pump with auxiliary heat for tempering the atmosphere in an enclosed space in which said thermostat means is located with said heat pump and auxiliary heat having at least a first heat pump output and a second auxiliary heat output with said heat pump output being more cost effective to operate than said auxiliary heat, including: means to enter selected temperatures in said thermostat means and further including means to sense an ambient temperature in said space; said thermostat means having a selected comfort setpoint temperature, and further having a selected energy savings setback setpoint temperature to define limits of the operation of said heat pump with auxiliary heat over a temperature control cycle; said thermostat means including microcomputer means having memory means and having two modes of operation; said memory means storing at least two operating time versus temperature curves with said curves selected to utilize said heat pump at said first output, or at both first and second said outputs simultaneously which causes said atmosphere to change from said energy savings setback setpoint temperature to said comfort setpoint temperature based upon a previous temperature control cycle; said thermostat means operating said heat pump upon said sensor temperature intersecting a first of said operating curves; said sensor temperature upon intersecting a second of said operating curves operating said auxiliary heat output; said curves being generally parallel to one another in a first of said modes of operation; and said first of said operating curves being held fixed at a minimum slope in a second of said modes to operate said heat pump with said second of said curves being adjusted in slope to increase or decrease the operation of said auxiliary heat based upon said previous temperature cycle.

DESCRIPTION OF THE PREFERRED EMBODIMENT

Figure 1:
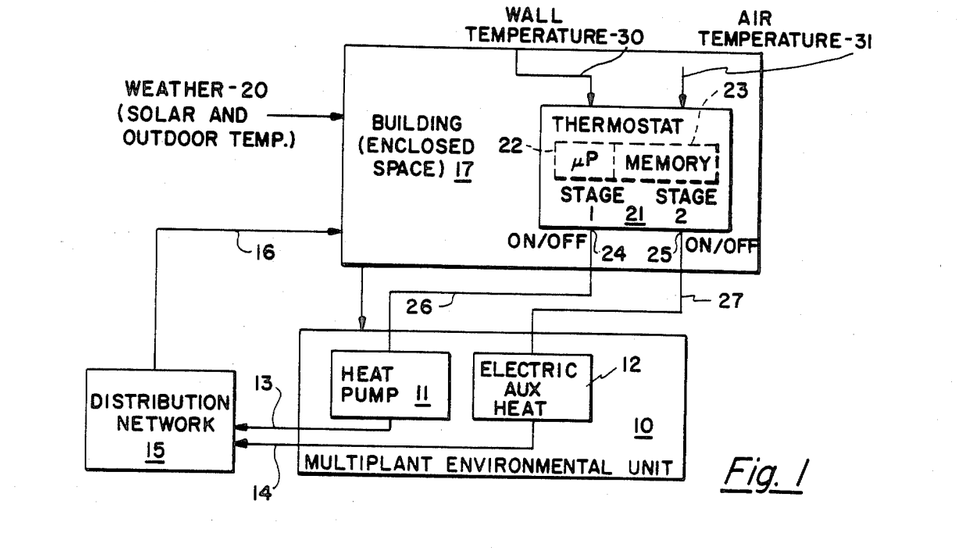
FIG. 1 is a block diagram of a building, an environmental unit for control, and the distribution network.

In FIG. 1 a multiplant environmental unit 10 is disclosed made up of a heat pump 11 and electric auxiliary heat 12. The heat pump 11 and auxiliary heat 12 provide heat (and cooling on the reverse cycle) via channels 13 and 14 to a distribution network 15. The distribution network 15 includes such equipment as a blower and duct work, and provides heating and/or cooling through a channel 16 to a building or enclosed space 17. The building or enclosed space 17 typically would be a residential structure, and would be affected by weather 20. Weather 20 includes such things as solar radiation, winds, and outdoor temperature.

Within the building or enclosed space 17 is a real time clock operated thermostat means 21 that includes a microcomputer or microprocessor 22 and a memory 23. The thermostat means 21 also would include a clock means, which normally is part of the microprocessor or microcomputer 22. The thermostat means 21 is indicated as having at least two stages 24 and 25 that are capable of providing switched, on-off control signals to conductors 26 and 27 that are used to in turn control the heat pump 11 and the auxiliary electric heat 12. The thermostat means 21 is normally affected by the wall temperature 30 and the air temperature 31 of the building or enclosed space 17. To this point, a conventional heat pump and auxiliary heat arrangement for a building or residence incorporating the novel system has been described. The temperature control system or thermostat means 23 of FIG. 1 is adapted to the present invention in a manner that will be disclosed subsequently.

Very briefly, the operation of FIG. 1 includes the operation of the thermostat means 21 to control temperature between a night setback temperature, for instance 60 degrees Fahrenheit, and a normal daytime comfort temperature of, say 70 degrees Fahrenheit. The thermostat means 21 has two stages that can be controlled to provide either the first or second modes of operation that were discussed in the Background of the Invention. In the first mode of operation, the first and second stages operate to pick up the temperature between the night setback temperature and the normal comfort temperature along a sloped ramp with the heat pump ramp and the auxiliary heat ramp being maintained parallel to one another. Their general slope varies from day-to-day depending on the conditions from the previous day. The heat pump 11 is controlled by the first stage of thermostat means 21, while the auxiliary electric heat 12 is controlled by the second stage of the thermostat means 21. The thermostat means 21 responds to the air temperature 31 and the wall temperature 30, while the enclosed building or space 17 is responsive to the outside weather 20 in combination with heat supplied through the distribution network 15 via the duct 16 in a conventional manner.

An important aspect of the present invention is the manner in which the heat pump 11 and the auxiliary electric heat 12 are operated by the thermostat means 21. This operation can best be explained in connection with the FIGS. 2 through 5 wherein the two modes of operation of the system will be described and explained.

FIGS. 2 through 5 disclose four graphs representing four different levels of operation of the temperature control system or thermostat means disclosed in FIG. 1. The temperature control system operates the multiplant environmental unit 10 with either the operation of the heat pump 11, or the operation of the heat pump 11 and the auxiliary heat 12. The graphs of FIGS. 2 through 5 plot temperature in degrees Fahrenheit at 36 versus time in hours at 35. The time in hours also is plotted against the operation of the multiplant environmental unit operation at 37 indicating whether the heat pump 11 is on or off, and whether the auxiliary heat 12 is on or off. In this way, the temperature and the outputs from the multiplant environmental unit 10 can be correlated. The heat pump function is normally referred to as a first output and the auxiliary heat as a second output. It is further understood that the thermostat means 21 of FIG. 1 has a sensor means or sensor temperature that allows the thermostat means 21 to track the temperature within the building or enclosed space 17. The real time clock that is contained within the thermostat 21 allows for the programming of the memory within the thermostat means 21 to provide the curves within FIGS. 2 to 5 and which will now be described in some detail.

Figure 2:
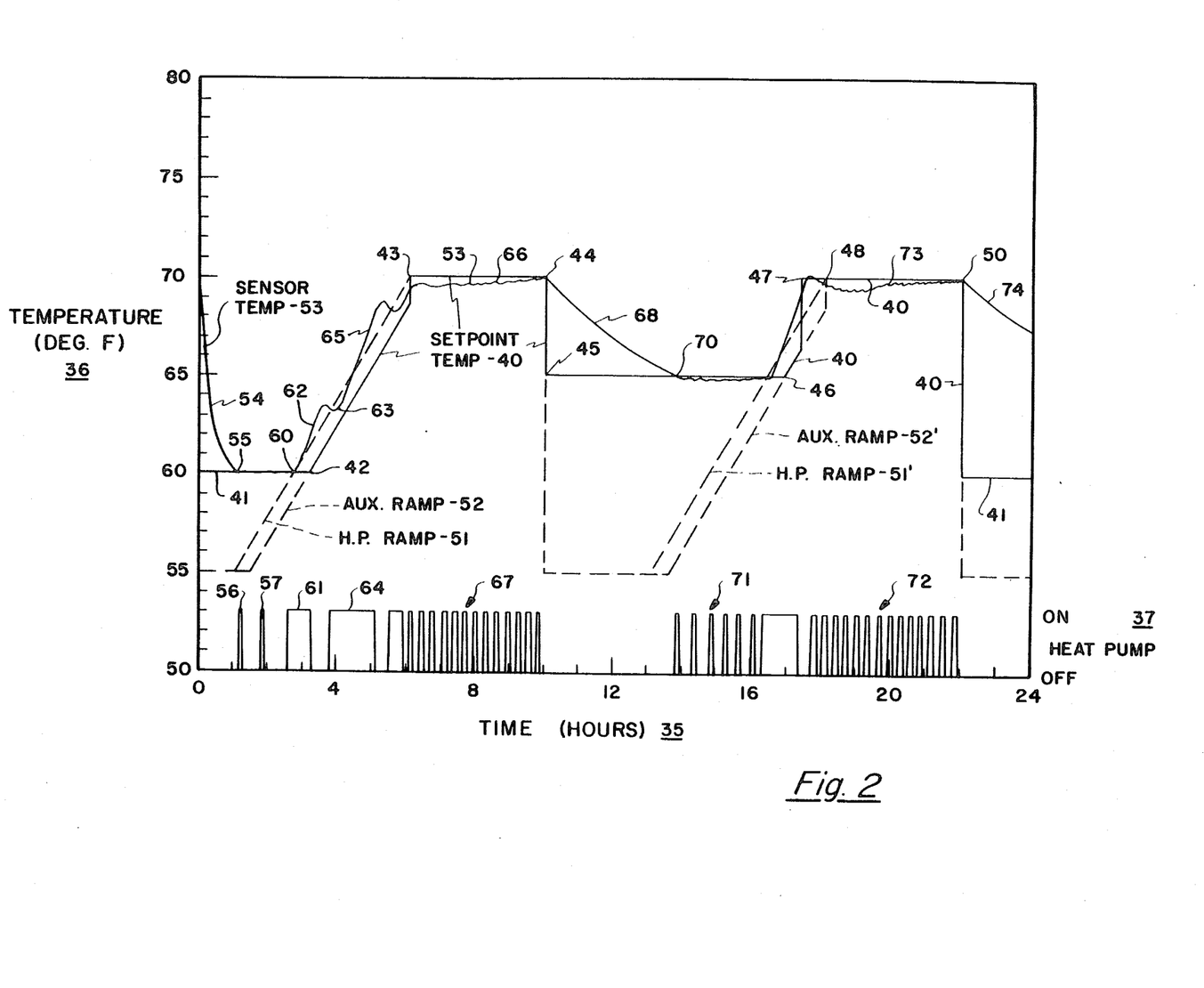
FIGS. 2 through 5 are graphs of time versus temperature, and temperature control cycles for an environmental unit for the building.

In FIG. 2 the graph of time 35 versus temperature 36 will be described first. The thermostat means 21 has programmed into it a desired setpoint temperature 40 that is used for energy conservation. The setpoint temperature 40 is maintained at 60 degrees Fahrenheit as shown at 41 including an interval at zero time (which could be equated to midnight). At some time during the morning hours, as indicated at 42, the setpoint temperature 40 is ramped up at some preselected number of degrees per hour until about 6 a.m. in the morning. The setpoint temperature 40 is raised to the normal or selected comfort setpoint temperature of 70 degrees at 43. This represents the need to raise the temperature within the building or enclosed space 17 from some energy saving or setback setpoint temperature 41 to provide a comfortable ambient within the building 17 when the occupants are up for the day. The setpoint temperature 40 is set back down at 44 to an afternoon energy saving temperature of 65 degrees Fahrenheit at 45 at approximately 10:00 in the morning. This second setback cycle is optional and can be used to save additional energy. The afternoon setback cycle has the same characteristics of the morning setback and pickup cycle and will be described only once in connection with the graphs of FIGS. 2 through 5. The afternoon setback or energy saving temperature 45 of 65 degrees Fahrenheit is maintained until a second setback ramp intersected at 46. The setpoint temperature 40 could be ramped at the same rate in the morning as in the afternoon, or could be ramped at a different rate. The principle of operation, however is the same.

The setpoint temperature is raised at 47 to the selected comfort setpoint temperature of 70 degrees Fahrenheit due to the operation of the system, but would reach that level at 48 regardless of operation by means of the real time clock and memory within the thermostat means 21. At 10:00 at night at 50, the setpoint temperature 40 is again lowered to the 60 degrees temperature as was indicated at 41. The cycle then repeats itself for the next day, but is adaptably changed based on whether or not the multiplant environmental unit 10 reached the desired temperature at the selected time. Changes in the operation of the multiplant environmental unit 10 are exemplified in four different conditions by the graphs of FIGS. 2 through 5.

The setpoint temperature 40 is established by two different functions. First is the energy saving setback setpoint temperature 41 along with the selected comfort setpoint temperature at 43. Between these two points the setpoint temperature 40 is established by the slope of two operating time versus temperature curves that are identified as a heat pump ramp 51 and an auxiliary heat ramp 52. The auxiliary heat ramp 52 coincides with the setpoint temperature 40 over the range of 60 to 68½ degrees, and then abruptly changes to intersect at 43 where the setpoint temperature has been raised to the selected comfort setpoint temperature of 70 degrees Fahrenheit. The heat pump ramp 51 is parallel to the auxiliary heat ramp 52 and separated by a fixed number of degrees. Ramp 51 intersects 70 degrees Fahrenheit at 43 as a point of reference. The slope of the heat pump ramp 51 and the auxiliary heat ramp 52 is adjusted from day-to-day based on the history of the operation of the temperature control system as will be explained in connection with FIGS. 2 through 5. At the outset of operation, a preestablished first operating mode is used as a point of reference for an explanation of operation of the system and that operation will now relate how the actual temperature in the building or enclosed space 17 is correlated with the heat pump 11, the auxiliary heat 12, and the setpoint temperature 40.

A sensor within the thermostat means 21 continuously measures the building or enclosed space temperature. This temperature is plotted as a sensor temperature 53. It is understood that when the setpoint temperature 40 was suddenly set down to 60 degrees at 10:00 at night at 50, that the building or enclosed space 17 was at 70 degrees Fahrenheit, and will drift down as shown at 54 after midnight. When the sensor temperature 53 drifts down and intersects at 55 the 60 degree setpoint temperature 41, it will be noted that the heat pump 11 of the multiplant environmental unit 10 switches from an off state to an on state. The heat pump cycles, as shown at 56 and 57, to maintain the sensor temperature 53 at 60 degrees Fahrenheit. At 60 the sensor temperature 53 intersects the heat pump ramp 51. At this point, the heat pump 11 is locked on as shown at 61 as the sensor temperature 53 rises at 62. The system is designed so that the locked on state of the heat pump 11 remains in that mode until the sensor temperature 53 exceeds the heat pump ramp 51 by some set number of degrees, or until the sensor comes within a specified value below the comfort setpoint. At that point, the heat pump is again deenergized. The sensor temperature drops at 63 to again intersect the heat pump ramp 51. This locks the heat pump 11 on at 64 and causes the sensor temperature 53 to rise again as shown at 65. Once again, as the sensor temperature 53 exceeds the heat pump ramp temperature 51 by some set number of degrees, the heat pump is again deenergized. This cycle continues to occur until the pickup time of 6:00 is reached at which time the setpoint temperature 40 is brought to 70 degrees. Once this occurs, the sensor temperature 53 (as shown at 66) continues to cycle the heat pump as shown generally at 67.

It will be noted that at no time did the sensor temperature 53 ever intersect the auxiliary heat ramp 52. As a result, the auxiliary heat was never energized in this pickup cycle. This indicates a rather mild outdoor temperature in which the heat pump 11 is fully capable of supplying all the heat necessary to the building or enclosed space 17 to reach and maintain the desired or selected comfort setpoint temperature of 70 degrees Fahrenheit.

At 10:00 in the morning, the selected comfort setpoint temperature 40 (as indicated at 44 and 45) is set back down to 65 degrees Fahrenheit. The sensor temperature 53 then drops off at 68 until the sensor temperature 53 intersects the setpoint temperature 40 at 70. This causes the heat pump to cycle as is indicated generally at 71 to maintain the 65 degree temperature. Once the setpoint temperature 53 intersects the heat pump ramp 51' for the afternoon pickup, the sensor temperature 53 rises until the 70 degree comfort temperature has been reached at approximately 47, which is ahead of the intersection of the heat pump ramp 51' and the comfort temperature at 48. This indicates that the system is capable of handling this load, and that the slope of the heat pump ramp 51 and auxiliary heat ramp 52 (as well as the heat pump ramp 51' and auxiliary heat ramp 52') can be shifted to a steeper slope. The heat pump 11 is again cycled as generally shown at 72 to maintain the sensor temperature 53 as indicated at 73. At 50, the setback for night operation at approximately 10:00 occurs, and the sensor temperature 53 again slopes off as indicated at 74.

If the outdoor temperature remains warm, the thermostat means 21 would recognize the fact that the heat pump had been locked on part of the time and exceeded the heat pump ramp 51 in comparing the sensor temperature 53 as was indicated at 62 and 65. This would cause the thermostat means 21 to increase the slope of auxiliary ramp 52 and the heat pump ramp 51. This adjustment would occur by making a change of approximately 12 percent in the rate of the slope thereby reducing the amount of time that the heat pump is on during the next cycle.

It is now assumed that the reverse of this condition is occurring. That is, that it is now getting colder outside rather than warmer. Also, the second half of the graphs, that is the afternoon setback, will be omitted from the discussion since it would correlate with the morning setback and pickup function.

Figure 3:
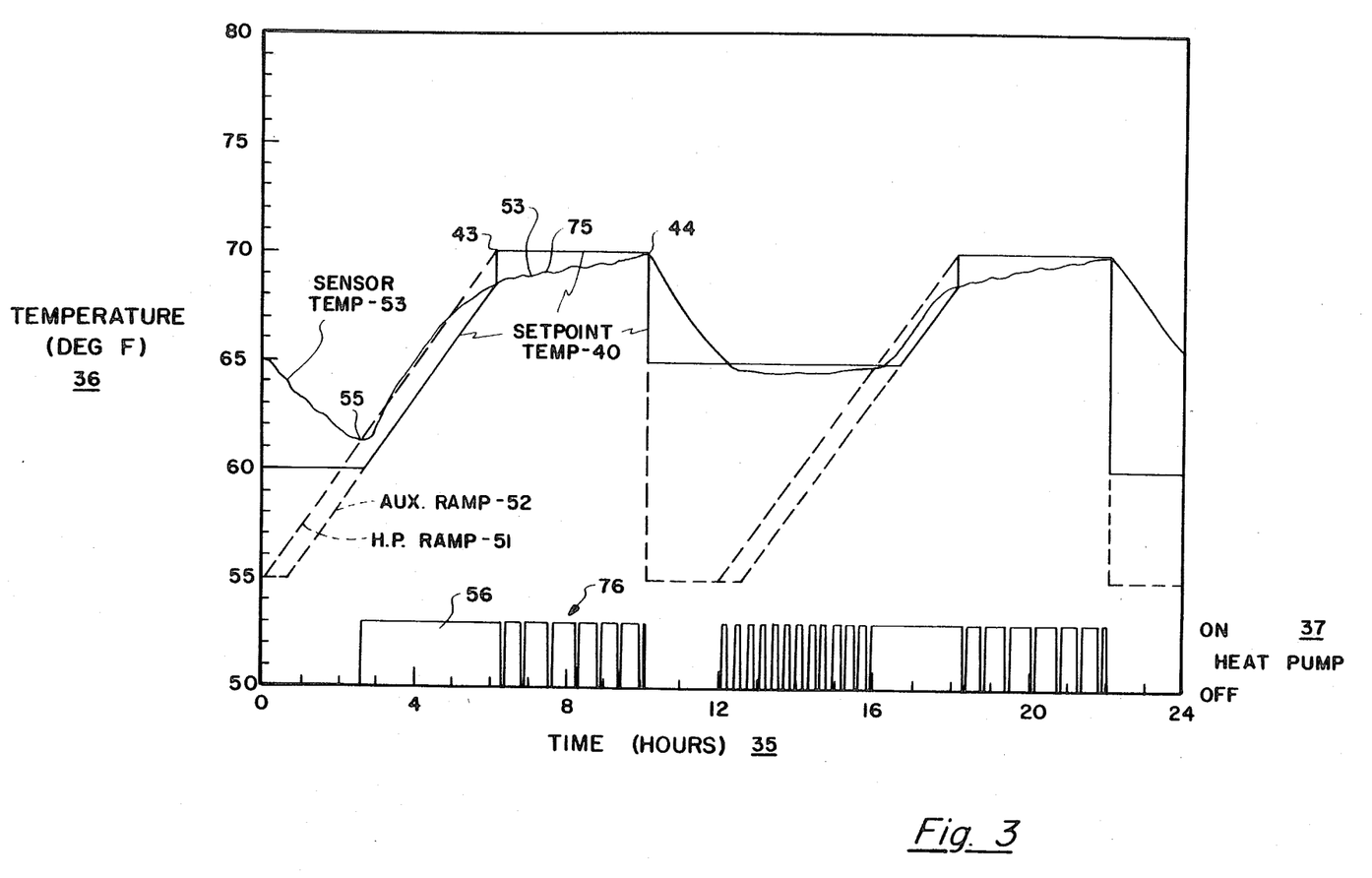

In connection with FIG. 3, an assumption is made that it has suddenly become colder outside than the case shown in FIG. 2, and that the memory 23 in the thermostat means 21 has recognized that the heat pump has not been satisfying the pickup demand on the morning pickup cycle. As a result of this, the operating time versus temperature curve stored in the memory 23 of the thermostat means 21 have been shifted to a shallower slope. Once again, the heat pump ramp 51 and the auxiliary heat pump ramp 52 are disclosed along with the setpoint temperature 40 and the sensor means temperature 53. It will be noted that the temperature of 60 degrees Fahrenheit is again used with the same setback and setup times for the morning and night, and the same 65 degrees Fahrenheit for the afternoon setback and setup times. Under the conditions disclosed in FIG. 3, that is a cooler outside environment, the heat pump is caused to operate for a greater period of time. This will be noted when a brief description of operation of FIG. 3 is provided. It will be noted that the sensor temperature 53 tends to fall off more quickly and intersects the heat pump ramp 51 at 55. The heat pump is locked on at 56, but since the sensor temperature 53 never exceeds the heat pump ramp 51 by a set number of degrees, the heat pump 11 is never cycled. The heat pump 11 thus is running continuously from early in the morning until well after the pickup time at 43. When the sensor temperature 53 comes within a set number of degrees of the selected comfort setpoint temperature of 70 degrees, as indicated at 75, the heat pump cycles as indicated generally at 76. This goes on until time at 44 where the temperature is set back from 70 to 65 degrees Fahrenheit. The same type of action would occur in the afternoon pickup and will not be described. It will be noted, however, that at no time did the sensor temperature 53 ever intersect the auxiliary ramp 52 during a pickup time, nor did the sensor temperature 53 ever deviate from the comfort setpoint temperature of 70 degrees Fahrenheit by a sufficient amount to bring on the auxiliary electric heat 12. This will become apparent when the operation in a colder environment is disclosed in connection with FIG. 4.

Figure 4:
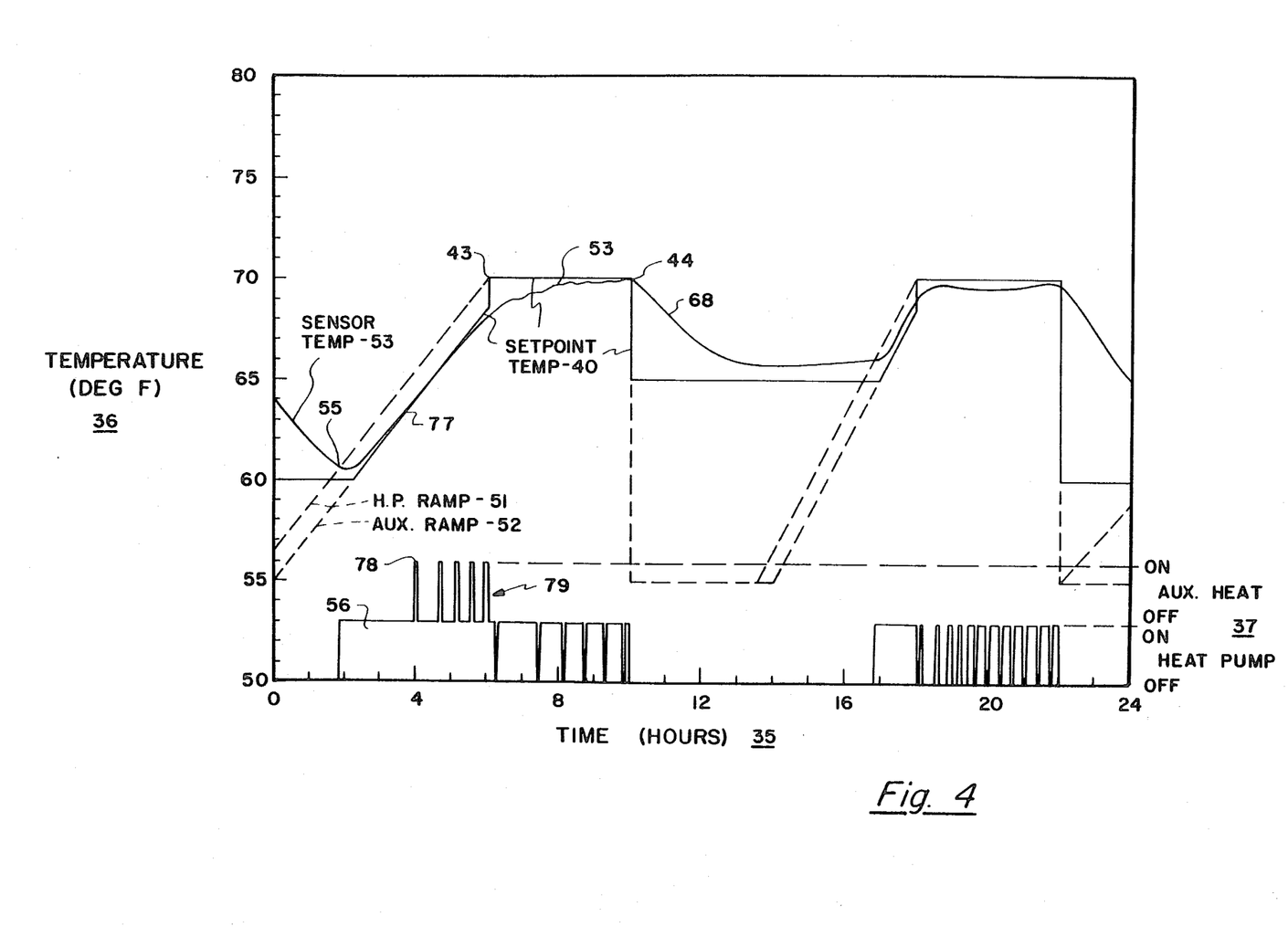

In FIG. 4 a still colder day is shown and it will be noted that the heat pump ramp 51 and the auxiliary ramp 52 have become even more shallow than previously shown. In FIGS. 2, 3 and 4 the heat pump ramp 51 intersects at 43 the desired temperature of 70 degrees, and the auxiliary ramp 52 is parallel to it. The only thing that has been occurring is that the slope of these two ramps has been made more shallow. As the sensor temperature 53 decays towards the setpoint temperature 40, it will be noted that the intersection 55 between the sensor temperature 53 and the heat pump ramp 51 occurs earlier in the morning. This causes the heat pump 11 to be locked on at 56. It is noted that the sensor temperature 53 continues to decay until it intersects the auxiliary heat ramp 52 at 77. At this point, the electric auxiliary heat 12 is turned on as shown at 78. Under these conditions the auxiliary electric heat 12 cycles as indicated generally at 79 to keep the sensor temperature 53 close to the setpoint temperature 40. When the temperature is set up to the comfort level of 70 degrees at 43, the sensor temperature 53 is just close enough to the setpoint temperature 40 so that the cycling of the heat pump 11 alone can bring the sensor temperature 53 up to the setpoint temperature 40 at 44. At 44, the afternoon or daytime setback occurs and the afternoon sensor temperature 68 decays with the afternoon pickup occurring in the same fashion as has been explained in connection with FIG. 2.

Figure 5:
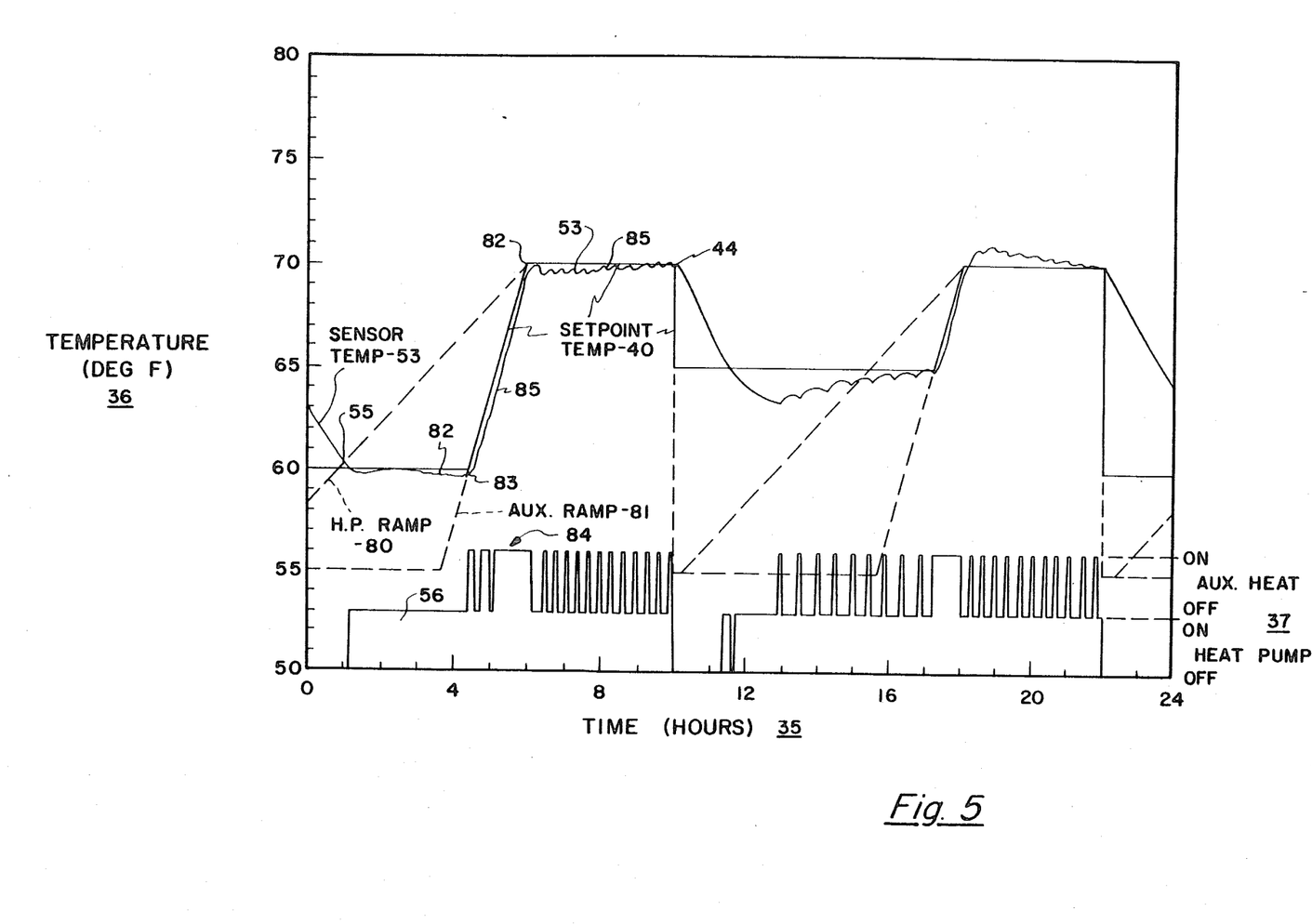

It will be noted at this time that the slope of the heat pump ramp 51 and the auxiliary ramp 52 has become shallower. This movement occurs until a preselected minimum slope is reached. When the preselected minimum slope is reached, the first mode of operation of the present system will end. The system will then shift to a second mode of operation, which is shown in FIG. 5. The determination of whether or not the system is in the first or second mode is established by the thermostat means 21 recognizing, by means of the microprocessor and memory 23, what has happened in a previous cycle. When the previous cycle indicates that the mode one minimum slope has been reached, the system will shift automatically to the second mode of operation. Conversely, when in the second mode of operation, the thermostat means can recognize that the second mode is no longer necessary, and the system will shift from the second mode back to the first mode of operation.

In FIG. 5 the second mode of operation is disclosed. A heat pump ramp 80 and an auxiliary heat ramp 81 is disclosed. The heat pump ramp 80 is identical in nature to the heat pump ramp 57 of FIGS. 2 to 4. The auxiliary heat ramp 81 is, however, significantly different. It will be noted that the ramps are no longer parallel and that they both intersect at a common point 82. The common point 82 corresponds to point 43 of FIGS. 2 through 4 where the setpoint temperature 40 intersects the selected comfort setpoint temperature at 70 degrees at 6:00 in the morning. The heat pump ramp 80 and auxiliary heat ramp 81 are independent, and the heat pump ramp 80 is maintained at a minimum slope for the system. The auxiliary heat ramp 81 is then made very steep to delay the operation of the auxiliary heat, as will be explained.

When the sensor temperature 53 again drifts down to intersect at 55 with the heat pump ramp 80, the heat pump 11 is locked on at 56. Under these cold conditions, the heat pump alone is unable to maintain the sensor temperature 53 at the 60 degree temperature as shown at 82. As soon as the sensor temperature 53 intersects the auxiliary heat ramp 81 at 83, the auxiliary heat is cycled at 84 to keep the setpoint temperature 40 within a tolerance of the auxiliary heat ramp 81. This causes the sensor temperature 53 to rise as shown at 85 with the temperature sensed being very close to the auxiliary heat ramp 81. This allows for the building or enclosed space 17 to reach 70 degrees at a time very close to the 6:00 setup time as indicated at 82. It will be noted at 85 that the cycling 84 of the auxiliary heat with the heat pump locked on, causes the sensor temperature 53 to stay very close to the 70 degree comfort setpoint temperature. Again the system at 44 is set back, and the afternoon pickup is comparable to the pickup disclosed for the morning. The system disclosed in FIG. 5 recognizes that in order to pickup the system by the desired time it becomes necessary to lock the heat pump 11 in a full on condition, while cycling the electric heat to bring the setpoint temperature 53 up to the selected comfort temperature setpoint of 70 degrees. The slope of the auxiliary ramp 81 can be modified to adjust for operation of the system. The auxiliary ramp slope increases if the sensor temperature is able to rise to some specified value below the comfort setpoint temperature at a time before or at the comfort time; otherwise the slope is decreased.

In order to get back to the first mode of operation, the weather would have to warm up enough so that sensor temperature 53 rises to end the recovery at 82 without ever intersecting the ramped setpoint temperature 40 (coincident with the auxiliary heat ramp 81), and indicates that less electric heat is necessary. Through the memory 23 in the microprocessor or microcomputer 22 of the thermostat means 21 the system shifts back to mode one and the system continuously adjusts on a day-to-day basis based on past history thereby allowing the system to respond each day to change in outdoor temperature conditions without in fact ever having any sensor in the outside environment.

Figure 6A:
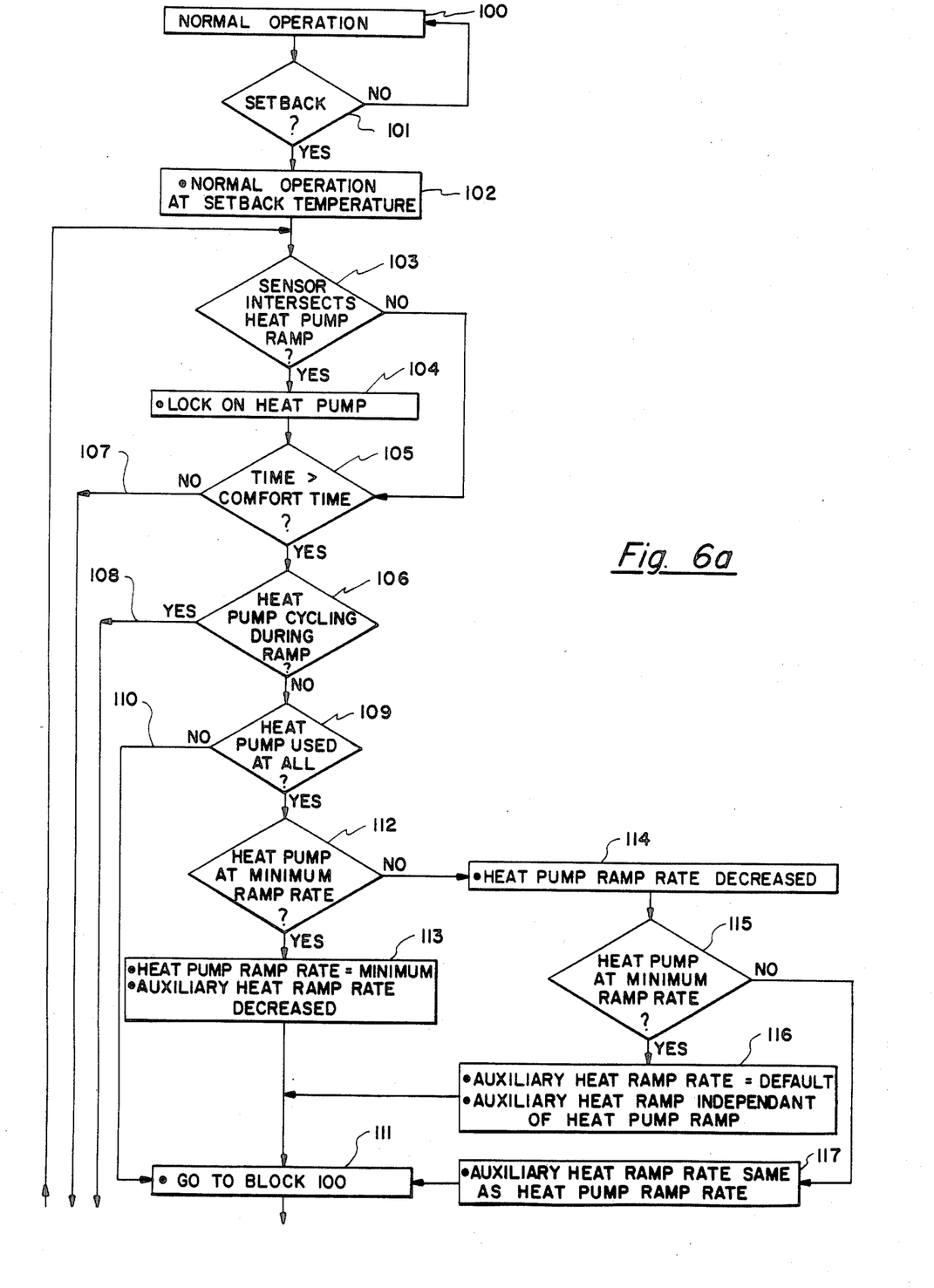
FIGS. 6a and b are flow charts of the operation of the system.

In FIGS. 6a and b is a flow chart of the operation of the temperature control system for control of a multi-plant environmental unit 10 for tempering the atmosphere in an enclosed space or building 17 in an energy efficient manner. The flow chart of FIGS. 6a and b provides a complete disclosure of the invention, as was illustrated by the graphs of FIGS. 2 through 5.

A normal operation of the system at a selected comfort temperature setpoint temperature is indicated at 100. The system then determines at 101 whether the thermostat means 21 is in a setback mode. If not, the system cycles back to 100. If it is in a setback mode, the system controls the space temperature at the selected setback temperature.

The establishment of a normal operation at a setback temperature at 102 then proceeds at 103 to determine whether the sensor temperature intersects the heat pump ramp. If that does occur, the heat pump is locked on at 104. If this does not occur, the system then moves to the decision block 105 to determine whether time is greater than the comfort time. The locked on heat pump inquiry of 104 then proceeds to the decision function at 105. If at 105 the time was not greater than the comfort time, the system proceeds at 107 and executes a program that will be disclosed in connection with FIG. 6b.

Upon determining that the time is greater than the comfort time at 105, the logic then determines at 106 whether the heat pump had cycled at any time after it was locked on at 104. At 106, if the heat pump was cycled, the system proceeds at 108 to a portion of the program shown in FIG. 6b. If it did not, a decision at 109 is made as to whether or not the heat pump in fact was used at all. If not, at 110, the system switches back to normal operation at 111. If it was operating, a decision is made at 112 whether the heat pump was activated using the minimum ramp rate. If it was, the auxiliary heat ramp rate is decreased and the heat pump ramp rate is left at the minimum value at 113. If it was not, the heat pump ramp rate is decreased at 114. The decision block at 115 determines whether the new heat pump ramp rate is at the minimum value. If so, at 116, the auxiliary heat ramp rate is set to its initial default value, and its future values are now independent of the heat pump ramp rate. If not, at 117 the auxiliary heat ramp rate has the same slope as the heat pump ramp rate. In each case determined at 116 or 117, the operation then proceeds with normal operation as disclosed at 111.

Figure 6B:
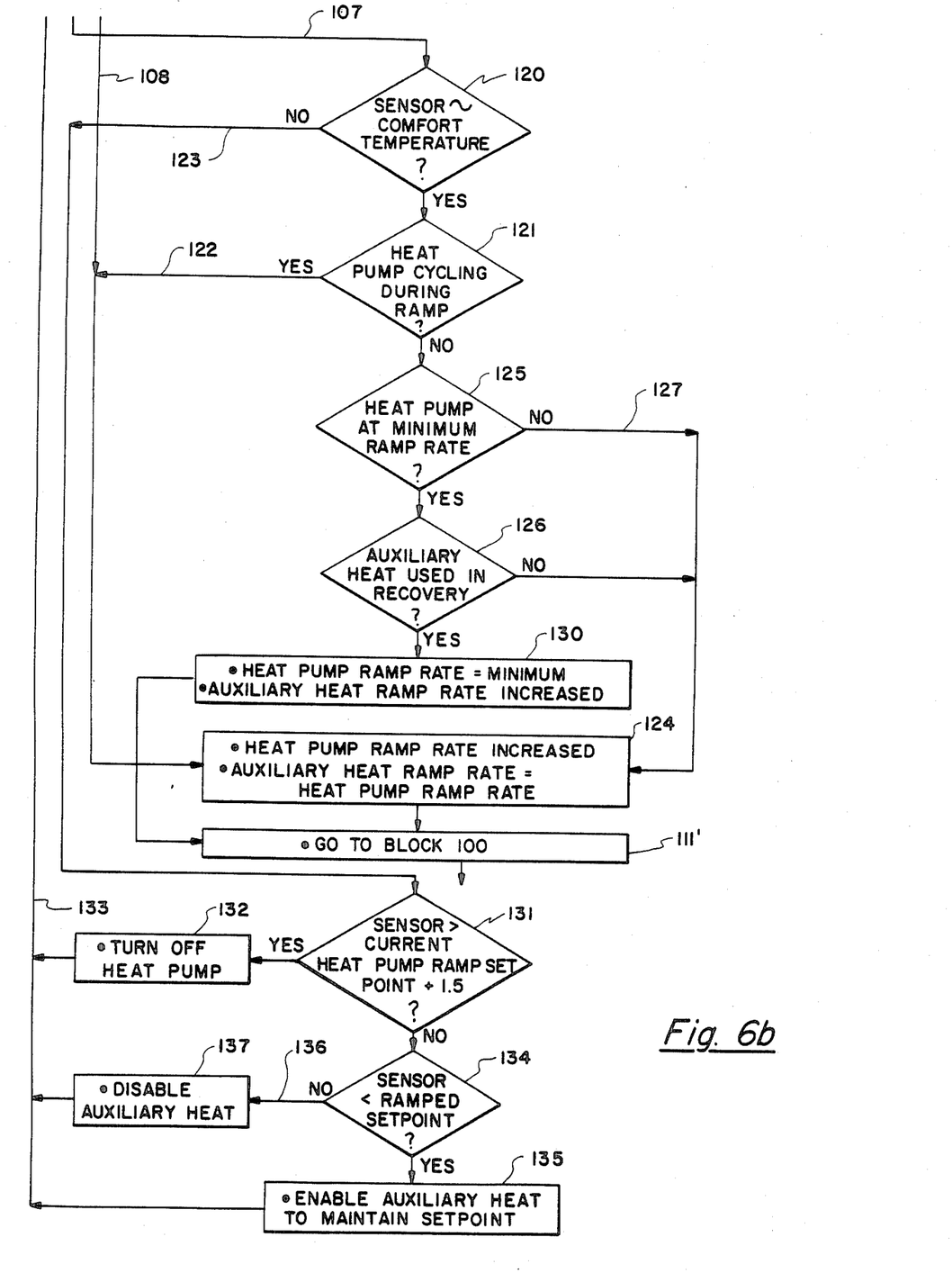

As was previously mentioned, in two cases the program operates into a portion of the program disclosed in FIG. 6b. At 107, if the time is not greater than the comfort time, a decision is made at 120 comparing the sensor and comfort temperatures. If they are within a certain tolerance of each other, a decision is made at 121 as to whether the heat pump had cycled after having been locked on at 104. If it had, at 122 the output of the decision block 121 coincides with the output of the decision block 106 as disclosed at 108. If the sensor and comfort temperatures were not in correspondence as interrogated at 120, an output at 123 moves the program to a further routine which will be discussed subsequently.

At 121, if the heat pump had cycled during the ramping, the program progresses at 122 to function 124 where the heat pump ramp rate is increased, and the auxiliary heat pump ramp rate is set equal to the heat pump ramp rate itself. This is a function that will also occur through the following routine.

If the heat pump had not cycled during the ramping as indicated in decision block 121, a decision is made at 125 whether the heat pump is at the minimum heat pump ramp rate. If it is, a determination is made at 126 as to whether the auxiliary heat was used during the recovery. If not, at 127 the system is closed back to the block 124. If at the decision block 126 it was determined that auxiliary heat was not used during recovery the system proceeds along 127 to block 124. If the auxiliary heat was used during recovery, at 130 the heat pump ramp rate is set equal to the minimum, and the auxiliary heat ramp rate is increased. This then exits to the normal operation at 111' by returning to block 100.

As was previously mentioned, if the sensor and comfort temperatures at decision block 120 were not in correspondence, a further subroutine was entered at 123. The entry at 123 determines at 131 whether the sensor is 1.5 degrees Fahrenheit greater than the current heat pump ramped temperature. If it is, the heat pump is turned off at 132 and the system returns via the route 133 to the decision block 103 of FIG. 6a. If not, the system progresses to the decision block 134 to determine whether the sensor is less than the ramped setpoint temperature. If it is, at 135, the auxiliary heat is enabled to maintain the setpoint. If it is not at 136, the auxiliary heat is disabled at 137. All of the blocks 132, 137 and 135 return via the route 133 to the decision block 103 to keep the system in constant recovery and operation.

The flow chart provided in FIGS. 6a and b is a flow chart outlining the functions within the temperature control system. The system was readily explained in a simplified form in connection with the graphs of FIGS. 2 to 5 and it should be apparent that many changes in the flow chart would be possible along with changes in the exact structure disclosed and still be within the concept of the invention disclosed in the present application. As such, the applicants wish to be limited solely by the scope of the appended claims.

The embodiments of the invention in which an exclusive property or right is claimed are defined as follows:

1. A temperature control system for control of a multiplant environmental unit for tempering the atmosphere in an enclosed space in an energy efficient manner, including: a multiplant environmental unit having at least a first output and a second output; said first output being more cost effective to operate than said second output; real time clock operated thermostat means located in said space; said thermostat means including means to enter selected temperatures and further including means to sense an ambient temperature in said space; said thermostat means having a selected comfort setpoint temperature, and further having a selected energy savings setback setpoint temperature to define limits of the operation of said multiplant environmental unit over a temperature control cycle; said thermostat means including microcomputer means having memory means and having two modes of operation; said memory means storing at least two operating time versus temperature curves with said curves selected to utilize said environment unit at said first output, or at both said first and said second outputs simultaneously which causes said atmosphere to change from said energy savings setback setpoint temperature to said comfort setpoint temperature with said memory including a previous temperature control cycle; said thermostat means operating said multiplant environmental unit upon said sensor temperature intersecting a first of said operating curves which energizes said first output; said sensor temperature upon intersecting a second of said operating curves operating said second output; said curves being generally parallel to one another in a first of said modes of operation; and said first of said operating curves being held fixed at a minimum slope in a second of said modes with said second of said curves being adjusted in slope to increase or decrease the operation of said second output based upon said previous temperature cycle.

2. A temperature control system for a multiplant environmental unit as claimed in claim 1 wherein said first of said operating curves always intersects said comfort setpoint temperature at a time programmed into said thermostat means for the start of said comfort setpoint temperature.

3. A temperature control system for a multiplant environmental unit as claimed in claim 2 wherein said second mode of operation of said control system having said second of said operating curves intersecting said comfort setpoint temperature at a time programmed into said thermostat means for the start of said comfort setpoint temperature.

4. A temperature control system for a multiplant environmental unit as claimed in claim 3 wherein said first output is locked into operation upon intersection of said sensed ambient temperature and said first operating curve; said first output is disabled when said ambient temperature sensed by said thermostat means rises to within a specified value below said comfort setpoint temperature at an off time; means to compare said off time with said programmed comfort time and said memory means adjusting the slope of said first of said curves for a next recovery period to compensate for said off time occurring before or after said programmed comfort time.

5. A temperature control system for a multiplant environmental unit as claimed in claim 4 wherein said first output is deenergized for variable time periods in the event that said ambient temperature in said space exceeds said first of said operating time versus temperature curves while said system is in said first or second modes of operation.

6. A temperature control system for a multiplant environmental unit as claimed in claim 3 wherein said memory means adjusts the slope of said first of said operating time versus temperature curves for a next recovery period.

7. A temperature control system for a multiplant environmental unit as claimed in claim 1 with said memory means storing a plurality of said time versus temperature curves to allow for control of temperature at a plurality of times of day.

8. A real time clock operated thermostat means for control in an energy efficient manner of a heat pump with auxiliary heat for tempering the atmosphere in an enclosed space in which said thermostat means is located with said heat pump and auxiliary heat having at least a first heat pump output and a second auxiliary heat output with said heat pump output being more cost effective to operate than said auxiliary heat, including: means to enter selected temperatures in said thermostat means and further including means to sense an ambient temperature in said space; said thermostat means having a selected comfort setpoint temperature, and further having a selected energy savings setback setpoint temperature to define limits of the operation of said heat pump with auxiliary heat over a temperature control cycle; said thermostat means including microcomputer means having memory means and having two modes of operation; said memory means storing at least two operating time versus temperature curves with said curves selected to utilize said heat pump at said first output, or at both first and second said outputs simultaneously which causes said atmosphere to change from said energy savings setback setpoint temperature to said comfort setpoint temperature based upon a previous temperature control cycle; said thermostat means operating said heat pump upon said sensor temperature intersecting a first of said operating curves; said sensor temperature upon intersecting a second of said operating curves operating said auxiliary heat output; said curves being generally parallel to one another in a first of said modes of operation; and said first of said operating curves being held fixed at a minimum slope in a second of said modes to operate said heat pump with said second of said curves being adjusted in slope to increase or decrease the operation of said auxiliary heat based upon said previous temperature cycle.

9. A real time clock operated thermostat means as claimed in claim 8 wherein said first of said operating curves always intersects said comfort setpoint temperature at a time programmed into said thermostat means for the start of said comfort setpoint temperature.

10. A real time clock operated thermostat means as claimed in claim 9 wherein said second mode of operation of said heat pump and said auxiliary heat having said second of said operating curves intersecting said comfort setpoint temperature at a time programmed into said thermostat means for the start of said comfort setpoint temperature.

11. A real time clock operated thermostat means as claimed in claim 10 wherein said first output is locked into operation upon intersection of said sensed ambient temperature and said first operating curve; said first output is disabled when said ambient temperature sensed by said thermostat means rises to within a specified value below said comfort setpoint temperature at an off time; means to compare said off time with said programmed comfort time and said memory means adjusting the slope of said first of said curves for a next recovery period to compensate for said off time occurring before or after said programmed comfort time.

12. A real time clock operated thermostat means as claimed in claim 11 wherein said first output is deenergized for variable time periods in the event that said ambient temperature in said space exceeds said first of said operating time versus temperature curves while said heat pump and said auxiliary heat is in said first or second modes of operation.

13. A real time clock operated thermostat means as claimed in claim 10 wherein said memory means adjusts the slope of said first of said operating time versus temperature curves for a next recovery period.

14. A real time clock operated thermostat means as claimed in claim 10 with said memory means storing a plurality of said time versus temperature curves to allow for control of temperature at a plurality of times of day.

* * * * *